US010281750B2

(12) United States Patent
Zhu et al.

(10) Patent No.: US 10,281,750 B2
(45) Date of Patent: May 7, 2019

(54) PROCESSING PLATFORM FOR DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Jinwei Zhu, Beijing (CN); Wensong Wang, Beijing (CN); Wujie Nan, Beijing (CN); Qun Liu, Beijing (CN); Bin Yang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/284,874

(22) Filed: Oct. 4, 2016

(65) Prior Publication Data
US 2017/0108717 A1 Apr. 20, 2017

(30) Foreign Application Priority Data
Oct. 20, 2015 (CN) .......................... 2015 1 0683733

(51) Int. Cl.
*G02F 1/13* (2006.01)
*B25B 11/00* (2006.01)

(52) U.S. Cl.
CPC .......... *G02F 1/1303* (2013.01); *B25B 11/005* (2013.01)

(58) Field of Classification Search
CPC ....... B25B 11/00; B25B 11/005; B25B 11/02; B25H 1/14–1/18; B66F 7/20; G02F 1/1303; G02F 1/1306
See application file for complete search history.

(56) References Cited

U.S. PATENT DOCUMENTS 2,381,664 A * 8/1945 Hansen ..................... B66F 7/20
187/213
3,700,228 A * 10/1972 Peale ................... B23Q 1/5437
269/57
(Continued)

FOREIGN PATENT DOCUMENTS

CN 2910855 Y 6/2007
CN 101488469 A 7/2009
(Continued)

OTHER PUBLICATIONS

First Chinese Office Action dated Sep. 2, 2016; Appln. No. 201510683733.4.

*Primary Examiner* — Tyrone V Hall, Jr.
(74) *Attorney, Agent, or Firm* — Ladas & Parry LLP

(57) ABSTRACT

A processing platform for display panel, comprising a bracket; a platform base having two end portions to which a rotation shaft is fixed, wherein the rotation shaft is rotatably connected with the bracket, and the rotation shaft and the platform base rotate about the rotation shaft as an axis; a platform being connected to the platform base by a telescopic mechanism which can make the platform move in a direction of approaching the platform base or deviating from the platform base, and having a surface which is away from the platform base and on which an suction structure for sucking the display panel is disposed.

19 Claims, 3 Drawing Sheets

(56) References Cited

U.S. PATENT DOCUMENTS

| | | | | |
|---|---|---|---|---|
| 4,369,958 A | * | 1/1983 | Maynard | B23Q 1/5437 269/61 |
| 4,705,438 A | * | 11/1987 | Zimmerman | B23Q 1/525 108/9 |
| 4,861,008 A | * | 8/1989 | Steele | B25B 11/005 269/21 |
| 4,913,402 A | * | 4/1990 | McJunkin, Jr. | B66F 3/24 254/89 H |
| 5,102,114 A | * | 4/1992 | Suda | B65G 49/068 271/18 |
| 9,568,753 B2 | * | 2/2017 | Jing | G02F 1/1303 |
| 2010/0011566 A1 | * | 1/2010 | Kim | B32B 38/18 29/592.1 |
| 2014/0061989 A1 | * | 3/2014 | Zhang | G02F 1/1303 269/37 |
| 2014/0178168 A1 | * | 6/2014 | Wang | B65G 47/907 414/749.6 |
| 2016/0340137 A1 | * | 11/2016 | Chen | B65H 15/00 |
| 2016/0347554 A1 | * | 12/2016 | Zhang | B65G 47/248 |

FOREIGN PATENT DOCUMENTS

| | | |
|---|---|---|
| CN | 201562878 U | 8/2010 |
| CN | 103523555 A | 1/2014 |
| CN | 104909164 A | 9/2015 |
| JP | 01254914 A | 10/1989 |
| KR | 1020050040900 A | 5/2005 |

* cited by examiner

PROCESSING PLATFORM FOR DISPLAY PANEL

TECHNICAL FIELD

Embodiments of the present disclosure relate to a processing platform for display panel.

BACKGROUND

A liquid crystal display panel is a flat display device comprised of a CF (Color Filter) substrate, a TFT (Thin Film Transistor) substrate and a liquid crystal layer encapsulated therebetween. When the liquid crystal display panel is subjected to processing or maintenance, according to different operating portions, the CF substrate or the TFT glass substrate can be selected as an operation surface. To accomplish such selection of operation surface, the liquid crystal display panel is usually required to be overturned by 180°.

To achieve the maintenance processing of the liquid crystal display panel, firstly, an overturning robot or a tilter is usually used to clamp and rotate the liquid crystal display panel by 180° so as to achieve the 180° overturning operation on the liquid crystal display panel, and then the overturned panel is conveyed onto a special platform and is subjected to maintenance or manufacturing operation thereon so as to achieve the maintenance or manufacturing of the liquid crystal display panel. During the operation, overturning and maintaining occupy different operating spaces and thus a large space will be taken up and it is a waste of space resources.

SUMMARY

Embodiments of the present disclosure provides a process platform for display panel, comprising a bracket; a platform base having two end portions to which a rotation shaft is fixed, wherein the rotation shaft is rotatably connected with the bracket, and the rotation shaft and the platform base rotate about the rotation shaft as an axis; a platform being connected to the platform base by a telescopic mechanism which can make the platform move in a direction of approaching the platform base or deviating from the platform base, the platform having a surface which is away from the platform base and on which an suction structure for sucking the display panel is disposed.

In the processing platform for display panel according to the embodiments of the present disclosure, since the platform is connected to the platform base by the telescopic mechanism and the telescopic mechanism can make the platform move in a direction of approaching the platform base or deviating from the platform base, a movement of the platform in a direction of approaching the display panel or deviating from the display panel can be achieved by the telescopic mechanism, so that attaching and detaching of the display panel is more convenient. Since the suction structure for sucking the display panel is disposed on the surface of the platform which is away from the platform base, when the power source of the suction structure is turned on, the display panel can be sucked onto the surface of the platform, thereby achieving the loading and clamping of the display panel; when the power source of the suction structure is turned off, the display panel can be released from the surface of the platform and drop to an initial position by gravity, thereby achieving the detaching of the display panel and thus the unloading of the display panel. When the display panel is sucked to the surface of the platform, since the rotation shaft is fixed to the two end portions of the platform base and the rotation shaft is rotatably connected with the bracket and is connected with the driving device which can make the rotation shaft and the platform base overturn about the rotation shaft as an axis, thus the platform is overturned under driving of the driving device and the bottom surface of the display panel becomes a top surface after the overturn, so that the overturning operation of the display panel is achieved, and after the overturn, the platform can be an operation platform for next maintenance on which the maintenance or manufacturing is performed on the display panel, thereby reducing the occupied space for maintenance of the display panel and saving the space resources.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In the description of the present invention, it will be appreciated that orientational or positional relationships indicated by terms of "central", "upper", "lower", "front", "back", "left", "right", "vertical", "horizontal", "top", "bottom", "inner" and "outer" and the like refer to the orientational or positional relationships based on the indication of the drawings, which are merely intended to describe the present disclosure and simplify the description, rather than indicate or suggest the device or the element of interest must have the particular orientation and be configured and operated in the particular orientation, and which cannot be construed as limitations to the present disclosure. In the description of the present invention, unless otherwise specified, "a plurality of" means two or more than two.

Figure 1:
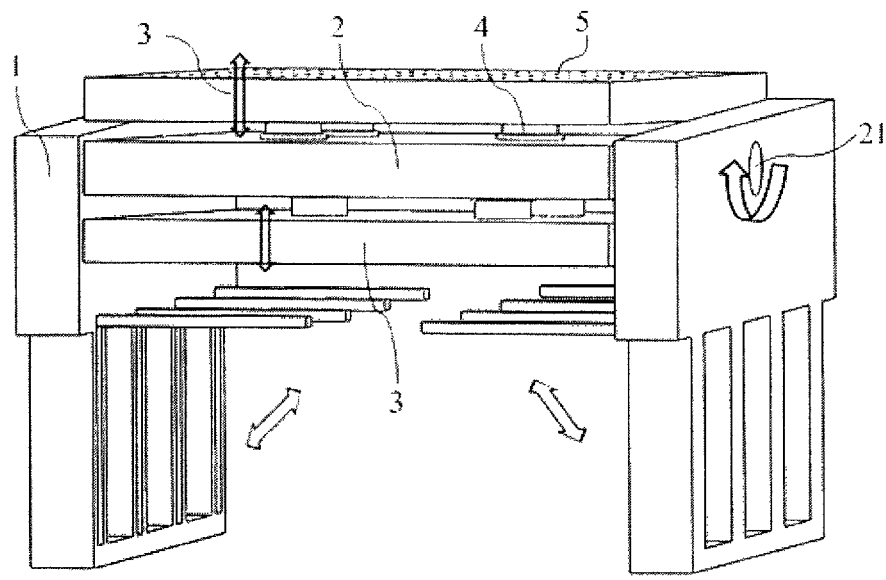
FIG. 1 is an illustrative structural view of a processing platform for display panel according to an embodiment of the present disclosure.

Referring to FIG. 1, which is a processing platform for display panel according to an embodiment of the present disclosure, the processing platform for display panel comprises a bracket 1; a platform base 2 having two end portions to which a rotation shaft 21 is fixed, the rotation shaft 21 is rotatably connected with the bracket 1 and is connected to a driving device which can drive the rotation shaft 21 and the platform base 2 to rotate about the rotation shaft 21 as an axis; a platform 3 being connected to the platform base 2 by a telescopic mechanism 4 which can make the platform 3 move in a direction of approaching the platform base 2 or deviating from the platform base 2, and having a surface which is away from the platform base 2 and on which an suction structure 5 for sucking the display panel is disposed.

In the processing platform for display panel according to the above embodiment of the present disclosure, since the platform 3 is connected to the platform base 2 by the telescopic mechanism 4 and the telescopic mechanism 4 can make the platform 3 move in a direction of approaching the platform base 2 or deviating from the platform base 2, a movement of the platform 3 in a direction of approaching the display panel or deviating from the display panel can be achieved by the telescopic mechanism 4, so that attaching and detaching of the display panel is more convenient. Since the suction structure 5 for sucking the display panel is disposed on the surface of the platform 3 which is away from the platform base 2, when the power source of the suction structure 5 is turned on, the display panel can be sucked onto the surface of the platform 3, thereby achieving the loading and clamping of the display panel; when the power source of the suction structure 5 is turned off, the display panel can be released from the surface of the platform 3 and drop to an initial position by gravity, thereby achieving the detaching of the display panel and thus the unloading of the display panel. When the display panel is sucked to the surface of the platform 3, since the rotation shaft 21 is fixed to the two end portions of the platform base 2 and the rotation shaft 21 is rotatably connected with the bracket 1 and is connected with the driving device which can make the rotation shaft 21 and the platform base 2 overturn about the rotation shaft 21 as an axis, the platform 3 is overturned along with the platform base 2 during the process and the bottom surface of the display panel becomes a top surface after the overturn, so that the overturning operation of the display panel is achieved, and after the overturn, the platform 3 can be an operation platform for next maintenance on which the maintenance or manufacturing is performed on the display panel, thereby reducing the occupied space for maintenance of the display panel and saving the space resources.

Figure 2:
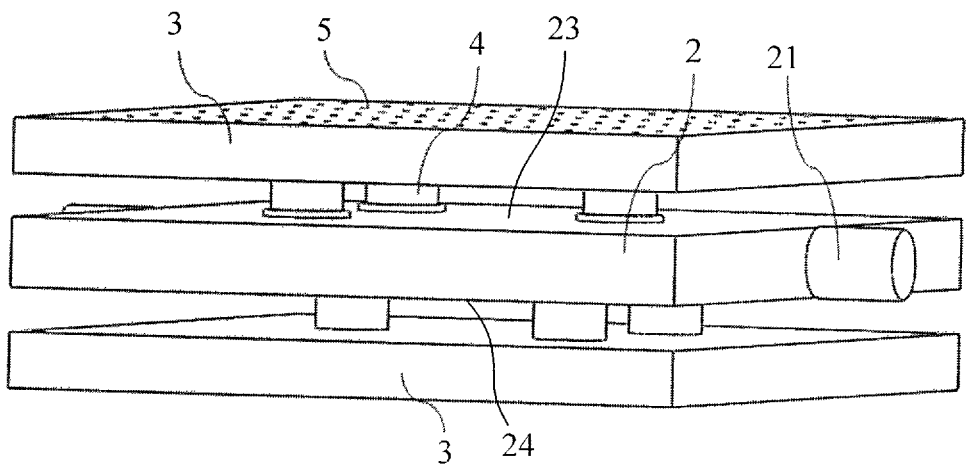
FIG. 2 is an illustrative view of a connecting structure between a platform base and a platform in a processing platform for display panel according to an embodiment of the present disclosure.

To shorten tact time, save time and improve productivity, in one embodiment of the present disclosure, a structure of the processing platform for display panel is illustrated in FIG. 2. That is, the platform base 2 comprises a first surface 23 and a second surface 24 opposite to each other. There are two platforms 3 and the two platforms 3 are respectively connected to the first surface 23 and the second surface 24 of the platform base 2 by the telescopic mechanism 4. When the platform base 2 is overturned, the two platforms 3 can be simultaneously overturned and when the platform 3 above the platform base 2 is engaged in maintenance or manufacturing operation of the display panel, the platform 3 beneath the platform base 2 is engaged in the attaching and detaching of the display panel. Therefore, the tack time is shortened, time is saved and the productivity is improved.

Figure 3:
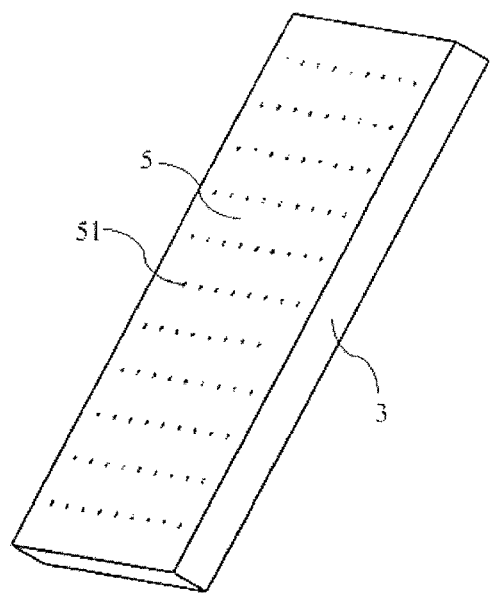
FIG. 3 is an illustrative structural view of an suction structure in a processing platform for display panel according to an embodiment of the present disclosure.

The suction structure 5 disposed on the surface of the platform 3 comprises a vacuum suction hole 51 opened on the surface of the platform 3 and a vacuum generator (not shown) connected with the vacuum suction hole 51, as illustrated in FIG. 3. The vacuum generator can suck out the air within the vacuum suction hole 51 when the surface of the platform 3 gets close to an upper surface of the display panel and the atmospheric pressure on the upper surface of the display panel is thus reduced, while the atmospheric pressure acting on the lower surface of the display panel maintains unchanged. Therefore, the atmospheric pressures acting on the upper and lower surfaces of the display panel are not the same and there is a pressure difference generated therebetween. By action of the pressure difference, the display panel is moved upwardly to a position adhered to the surface of the platform 3, thereby achieving the loading and clamping of the display panel. On the contrary, the vacuum generator can discharge air into the vacuum suction hole when the lower surface of the display panel approaches a position where it is initially placed, thereby increasing the atmospheric pressure on the upper surface of the display panel, so that the atmospheric pressures acting on the upper and lower surfaces of the display panel are balanced. At this time, the display panel can drop to the initial position by its own gravity and the unloading operation of the display panel is thus achieved. This structure is simple, and during the course where the display panel is sucked to the platform 3 and is overturned, the atmospheric pressure is unchanged and the suction force acting on the display panel is unchanged, so that the display panel is prevented from falling off during the overturning process.

In one embodiment of the present disclosure, to increase the acting force generated by the suction structure 5, there are a plurality of vacuum suction holes 51 and the vacuum suction holes 51 are uniformly distributed over the surface of the platform 3. When the upper surface of the display panel is adhered to the plurality of vacuum suction holes 51, the suction force applied to the display panel is n times the suction force generated by a single vacuum suction hole 51, wherein n indicates the number of the suction holes 51 interacting with the display panel. Therefore, the suction force generated by the suction structure 5 is increased. Moreover, since the plurality of vacuum suction holes 51 are uniformly distributed on the surface of the platform 3, the suction forces generated by the plurality of vacuum suction holes 51 are uniformly applied on the upper surface of the display panel, so that the uniformity of force applied on the display panel is improved and the display panel is further prevented from falling off during the overturning process. Since the plurality of vacuum suction holes 51 are uniformly distributed on the surface of the platform 3, no matter to which position on the surface of the platform 3 the upper surface of the display panel is sucked, the suction force of the suction structure 5 on the display panel is identical. Therefore, the stability and consistency of the suction force are ensured.

Figure 4:
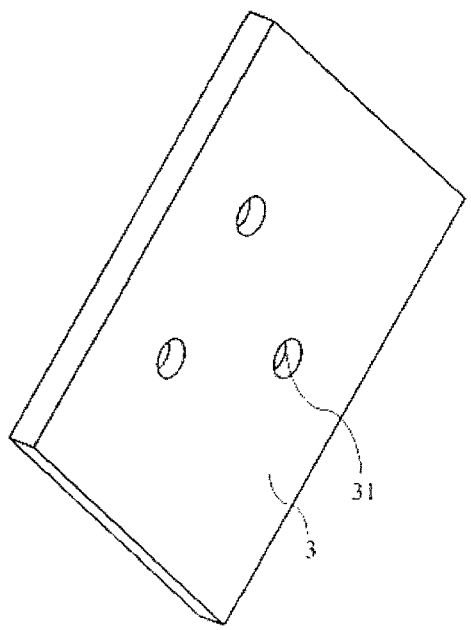
FIG. 4 is an illustrative structural view of a platform in a processing platform for display panel according to an embodiment of the present disclosure.
Figure 5:
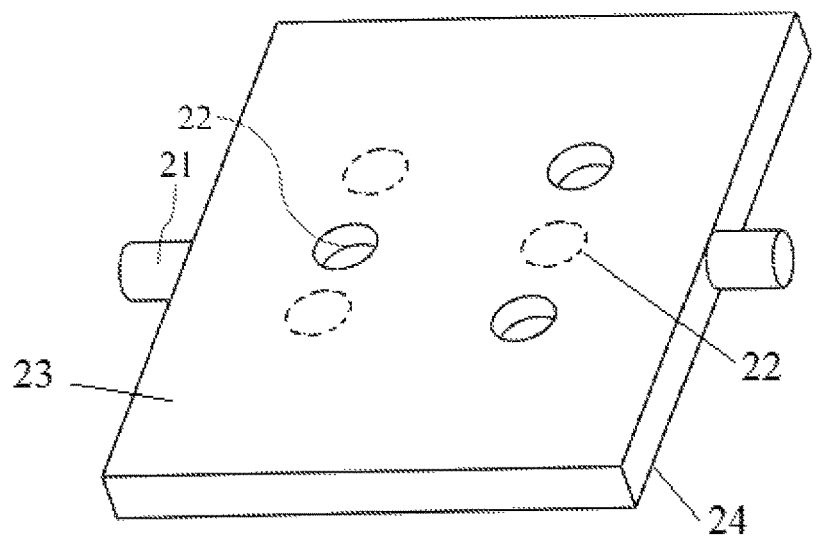
FIG. 5 is an illustrative view of a connecting structure of a supporting arm onto a bracket in a processing platform for display panel according to an embodiment of the present disclosure.

The telescopic mechanism 4 can be an electric lifter, a hydraulic cylinder, an air cylinder which is not restricted herein. In one embodiment of the present disclosure, the telescopic mechanism 4 is an air cylinder which is suitable for an occasion of high load and short telescopic distance. The air cylinder is connected with a pipeline which can be connected with the same air source as the above-described vacuum generator, and thus there is no need to additionally provide a hydraulic apparatus. When the telescopic mechanism 4 is an air cylinder, the body of the cylinder is fixed onto the platform base 2 and the telescopic rod of the cylinder is connected with the platform 3 via a platform mounting hole 31 as illustrated in FIG. 4. When the cylinder is pressurized via the pipeline connected, the compressed air within the cylinder can push the telescopic rod to protract so that the platform 3 connected with the telescopic rod is moved in a direction of deviating from the platform base 2. When the cylinder is depressurized via the pipeline connected, the compressed air within the cylinder can make the telescopic rod retract so that the platform 3 connected with the telescopic rod is moved in a direction of approaching the platform base 2.

Further, to support the platform 3 in a more effective and more stable manner by means of the cylinder, a plurality of telescopic rods can be provided. During the movement of the platform 3 in a direction of approaching or deviating from the platform base 2, a force exerted on each telescopic rod is small, so that it is avoided that the telescopic mechanism 4 has a shortened life due to excessive forces. The plurality of telescopic rods are uniformly distributed between the platform base 2 and the platform 3, so that the forces and the force moments exerted on the portions of the platform 3 are small. Moreover, the force moments are balanced, which prevents the whole platform 3 from tilting and falling down due to a large tilting moment exerted on a certain portion of the platform 3.

For example, the number of the telescopic rods can be two, three, four or five, which is not restricted herein. In one embodiment of the present disclosure, there are three telescopic mechanisms 4 and they are positioned at the three apexes of an isosceles triangle, which ensures the distribution uniformity of the telescopic mechanism 4 between the platform base 2 and the platform 3. Since there are three telescopic rods and they are positioned at the three apexes of an isosceles triangle, the three telescopic rods can reduce the forces and the force moments exerted on the portions of the platform 3 and make the force moments be in a balanced state, which prevents the whole platform 3 from tilting and falling down due to a large tilting moment exerted on a certain portion of the platform 3. In one embodiment of the present disclosure, the center of gravity of the above isosceles triangle is at the center of the platform 3, so that the force moments on the platform 3 are in a more balanced state, which prevents the whole platform 3 from tilting and falling down due to a large tilting moment exerted on a certain portion of the platform 3.

To reduce the volume of the processing platform for display panel and thus the space occupied by the processing platform for display panel, the telescopic mechanisms 4 can be arranged in the positions on the platform base 2 as illustrated in FIG. 1 or FIG. 2. That is, the first surface 23 and the second surface 24 of the platform base 2 are each provided thereon with mounting holes 22 for mounting the telescopic mechanisms 4. The mounting holes 22 on each of the first surface 23 and the second surface 24 are arranged in an isosceles triangle, and the projection on the second surface 24 of the mounting holes 22 on the first surface 23 does not coincide with the mounting holes 22 on the second surface 24. Such an arrangement can prevent an interference between the mounting holes 22 on the first surface 23 and the mounting holes 22 on the second surface 24, so that the thickness of the platform base 2 can be smaller than a sum of the depth of the mounting holes 22 on the first surface 23 and the depth of the mounting holes 22 on the second surface 24 while ensuring the structural strength of the platform base 2. But, when the projection on the second surface 24 of the mounting holes 22 on the first surface 23 and the mounting holes 22 on the second surface 24 has an overlapped region, the thickness of the platform base 2 has to be larger than the sum of the depth of the mounting holes 22 on the first surface 23 and the depth of the mounting holes 22 on the second surface 24. Therefore, the fact that the projection on the second surface 24 of the mounting holes 22 on the first surface 23 does not coincide with the mounting holes 22 on the second surface 24 can achieve an effect of reducing the thickness of the platform base 2 and thus reducing the volume of the processing platform for display panel and thus the space occupied by the processing platform for display panel.

Figure 6:
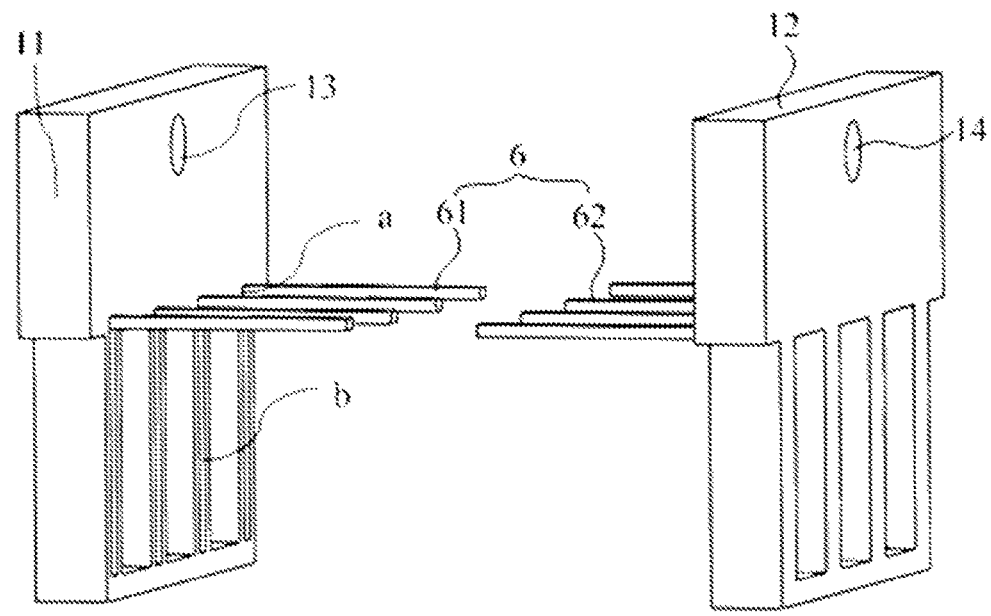
FIG. 6 is an illustrative structural view of a platform base in a processing platform for display panel according to an embodiment of the present disclosure.

To support the display panel to be overturned, in one embodiment of the present disclosure, as illustrated in FIG. 6, supporting arms 6 are provided on the bracket 1. The supporting arms 6 are positioned in an area below the platform base 2 and the platform 3. The display panel to be overturned can be placed on the supporting arms 6 by an robot and thus be subjected to operations of loading and clamping, and overturning and processing, and etc. The platform 3 can place the display panel after being processed onto the supporting arms 6 and the display panel can be unloaded by the robot.

To avoid an interference of the mounting position of the supporting arms 6 with a rotating space of the platform base 2 and platform 3, the supporting arms 6 can be disposed to be rotatably connected with the bracket 1. The supporting arms 6 can be rotatable between a first position (Position a as illustrated in FIG. 6) and a second position (Position b as illustrated in FIG. 6). When the supporting arms 6 are rotated to the first position, the supporting arms 6 are in parallel with the platform 3 and are positioned in the area below the platform base 2 and the platform 3. When the supporting arms 6 are rotated to the second position, the supporting arms 6 move away from the area below the platform base 2 and the platform 3. At this time, the platform base 2 and the platform 3 can be freely rotated in the rotating space without an interference with the supporting arms 6.

To facilitate loading and unloading of the display panel onto and from the supporting arms 6 by the robot, referring to FIG. 6, in one embodiment of the present disclosure, the bracket 1 comprises a first post 11 and a second post 12 oppositely arranged. The rotation shafts 21 on both end portions of the platform base 2 are rotatably connected with a first shaft hole 13 on the first post 11 and a second shaft hole 14 on the second post 12 respectively. The supporting arms 6 comprises a first supporting arm 61 and a second supporting arm 62 which are connected onto two confronting surfaces of the first post 11 and the second post 12. The first supporting arm 61 and the second supporting arm 62 face each other and are disposed with an interval therebetween. The interval region between the first supporting arm 61 and the second supporting arm 62 allows the manipulator of the robot to pass through so as to load and clamp or unload the display panel. Such a structure is simple and easy to accomplish.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510683733.4 filed on Oct. 20, 2015, the disclosure of which is hereby entirely incorporated by reference as a part of the present disclosure.

The invention claimed is:
1. A processing platform for display panel, comprising a bracket;

a platform base having two end portions to which a rotation shaft is fixed, wherein the rotation shaft is rotatably connected with the bracket, and the rotation shaft and the platform base rotate about the rotation shaft as an axis; and a platform being connected to the platform base by a plurality of telescopic mechanisms which can make the platform move in a direction of approaching the platform base or deviating from the platform base, the platform having a surface which is away from the platform base and on which a suction structure for sucking the display panel is disposed;

wherein the plurality of telescopic mechanisms are uniformly disposed on the platform base and are connected with the platform.

2. The processing platform for display panel according to claim 1, wherein the platform base comprises a first surface and a second surface opposite to each other, and there are two platforms and the two platforms are respectively connected to the first surface and the second surface of the platform base by the telescopic mechanism.

3. The processing platform for display panel according to claim 2, wherein the first surface and the second surface of the platform base are each provided thereon with mounting holes for mounting the telescopic mechanism, and a projection on the second surface of the mounting holes on the first surface does not coincide with the mounting holes on the second surface.

4. The processing platform for display panel according to claim 2, wherein the suction structure comprises a vacuum suction hole disposed on the surface of the platform and a vacuum generator which is in communication with the vacuum suction hole.

5. The processing platform for display panel according to claim 4, wherein there are a plurality of the vacuum suction holes and the vacuum suction holes are uniformly distributed on the surface of the platform.

6. The processing platform for display panel according to claim 2, wherein the telescopic mechanism comprises a plurality of air cylinders, a first group of air cylinders among the plurality of air cylinders has their bodies fixed onto the first surface of the platform base and their telescopic rods connected with a first platform of the two platforms, and a second group of air cylinders among the plurality of air cylinders has their bodies fixed onto the second surface of the platform base and their telescopic rods connected with a second platform of the two platforms.

7. The processing platform for display panel according to claim 6, wherein the first group of air cylinders are uniformly disposed on the first surface of the platform, and the second group of air cylinders are uniformly disposed on the second surface of the platform.

8. The processing platform for display panel according to claim 2, wherein the bracket is provided with supporting arms thereon, and the supporting arms are positioned in an area below the platform base and the platform.

9. The processing platform for display panel according to claim 8, wherein the supporting arms are rotatably connected with the bracket, the supporting arms are rotatable between a first position and a second position, and when the supporting arms are rotated to the first position, the supporting arms are in parallel with the platform and are positioned in the area below the platform base and the platform, and when the supporting arms are rotated to the second position, the rotation shaft and the platform base are overturned about the rotation shaft as an axis.

10. The processing platform for display panel according to claim 9, wherein the bracket comprises a first post and a second post oppositely arranged, the rotation shafts on both end portions of the platform base are rotatably connected with the first post and the second post respectively, the supporting arms comprises a first supporting arm and a second supporting arm which are connected onto two confronting surfaces of the first post and the second post, and the first supporting arm and the second supporting arm face each other and are disposed with an interval therebetween.

11. The processing platform for display panel according to claim 1, further comprising a driving device which is configured to drive the rotation shaft and the platform base to rotate about the rotation shaft.

12. The processing platform for display panel according to claim 1, wherein the suction structure comprises a vacuum suction hole disposed on the surface of the platform and a vacuum generator which is in communication with the vacuum suction hole.

13. The processing platform for display panel according to claim 12, wherein there are a plurality of the vacuum suction holes and the vacuum suction holes are uniformly distributed on the surface of the platform.

14. The processing platform for display panel according to claim 1, wherein the telescopic mechanism comprises an air cylinder having its body fixed onto the platform base and its telescopic rod connected with the platform.

15. The processing platform for display panel according to claim 1, comprising three telescopic mechanisms which are positioned at apexes of an isosceles triangle.

16. The processing platform for display panel according to claim 15, wherein the isosceles triangle has its geometric center to be in coincide with the center of the platform.

17. The processing platform for display panel according to claim 1, wherein the bracket is provided with supporting arms thereon, and the supporting arms are positioned in an area below the platform base and the platform.

18. The processing platform for display panel according to claim 17, wherein the supporting arms are rotatably connected with the bracket, the supporting arms are rotatable between a first position and a second position, and when the supporting arms are rotated to the first position, the supporting arms are in parallel with the platform and are positioned in the area below the platform base and the platform, and when the supporting arms are rotated to the second position, the rotation shaft and the platform base are overturned about the rotation shaft as an axis.

19. The processing platform for display panel according to claim 18, wherein the bracket comprises a first post and a second post oppositely arranged, the rotation shafts on both end portions of the platform base are rotatably connected with the first post and the second post respectively, the supporting arms comprises a first supporting arm and a second supporting arm which are connected onto two confronting surfaces of the first post and the second post, and the first supporting arm and the second supporting arm face each other and are disposed with an interval therebetween.

* * * * *